G. HEIDGERKEN.
HAY BALER.
APPLICATION FILED AUG. 23, 1911.
1,035,585.
Patented Aug. 13, 1912.
2 SHEETS—SHEET 1.
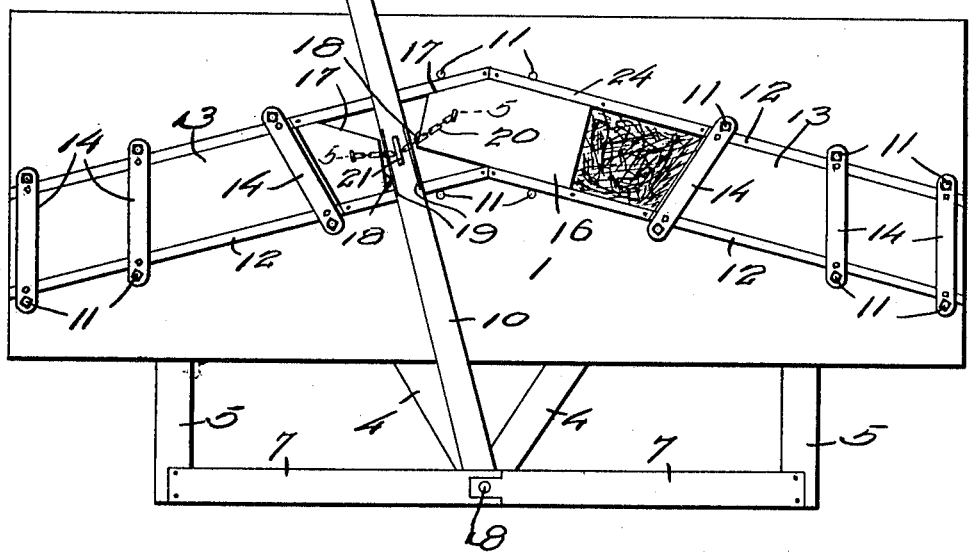

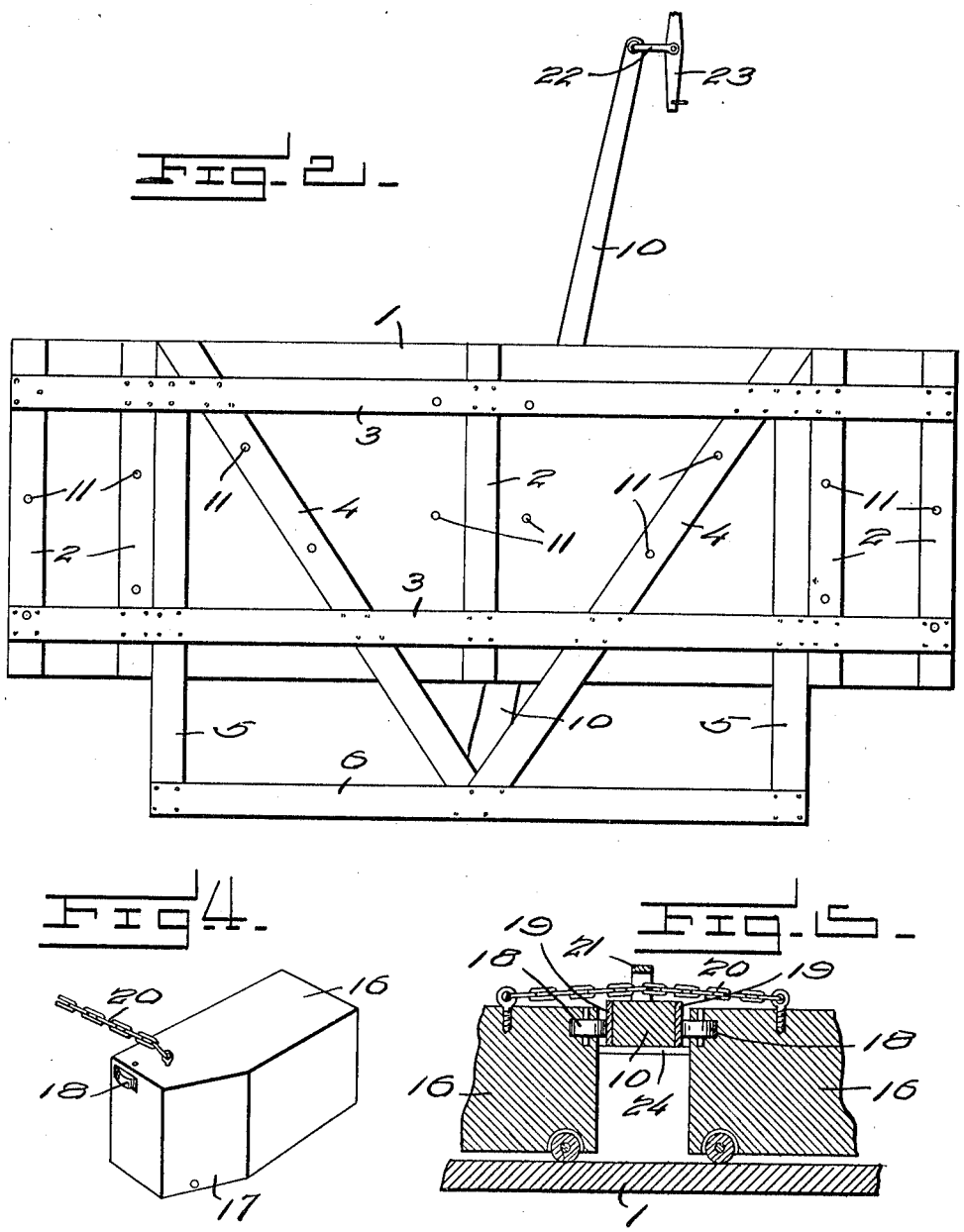

UNITED STATES PATENT OFFICE.

GEORGE HEIDGERKEN, OF RAPID CITY, SOUTH DAKOTA.

HAY-BALER.

1,035,585.  Specification of Letters Patent.  Patented Aug. 13, 1912.

Application filed August 23, 1911. Serial No. 645,585.

*To all whom it may concern:*

Be it known that I, GEORGE HEIDGERKEN, a citizen of the United States, residing at Rapid City, in the county of Pennington and State of South Dakota, have invented certain new and useful Improvements in Hay-Balers, of which the following is a specification.

My invention relates to improvements in hay balers, and has for its leading object the provision of an efficient device of this character which may be installed at a nominal expense and which shall be operated by horse power to secure efficient satisfactory packing of the hay.

The further object of my invention is the provision of an improved hay baling machine of this character which shall be so constructed that the rocking movement or oscillation of the operating lever will serve to pack a hay bale when moved in either direction, the machine being so constructed that while one of the packers is working the other will be moved into inoperative position to allow additional hay to be placed in the baler.

Another object of my invention is the provision of an improved form of operating lever and pressing piston for operation thereby and of improved means for so connecting the lever and the pressing piston as to secure a maximum efficiency therefrom with a minimum amount of wear.

Other objects and advantages of my improved hay baler will be readily apparent by reference to the following description taken in connection with the accompanying drawings, and it will be readily understood that I may make any modifications in the specific structure shown and described within the scope of my claims without departing from or exceeding the spirit of the invention.

Figure 1 represents a top plan view of my complete hay baler in use. Fig. 2 represents a bottom plan view thereof. Fig. 3 represents a front view of the same. Fig. 4 represents a perspective view of one of the packing pistons, and Fig. 5 represents a sectional view on the line 5—5 of Fig. 1.

In the drawings, the numeral 1 designates the platform of my improved hay baler, said platform having secured on its under face the transverse braces 2 and the longitudinally extending brace beams 3, diagonal brace beams 4 and transverse brace beams 5 having portions projecting laterally from one side of the platform. A brace 6 connects the ends of the braces 4 and 5, while rising from the said braces are the yoke braces 7 which form a bearing for the upper end of the shaft or spindle 8, said spindle having its lower end secured at the intersection of the diagonal braces 4, and having a squared central portion 9, the front end of the operating lever 10 being rotatably mounted on the upper portion of the spindle 8.

Rising from the platform 1 are the posts 11 which have their lower ends passing downward through the platform and fitting in sockets in the transverse and longitudinal braces of the said platform. Said posts are arranged in parallel rows in two sets which meet each other to form a wide V, while secured to the inner faces of the various posts are the planks 12 which form the inclosing walls of the packing chamber of my improved baler, said chamber having a top 13 which is secured to the cross braces or plates 14 connecting the upper ends of the posts 11. The inner or meeting ends of the side planks 12 have the reduced or cut away portion 15 whose purpose will be later described, the side posts therefor being shortened to extend barely to the top of the said reduced portion 15.

Slidably mounted upon the platform 1 and included between the portion 15 of the walls 12 of the baling chamber are the packing blocks or pistons 16 of height to just pass beneath the top 13 of the baling chamber, said blocks each having the rear beveled face 17 to permit of the same moving out of their respective channels a distance into the channel of the opposite block beyond the point of the V. Mounted on the ends of said blocks near the upper portion thereof are the antifriction rollers 18 which are adapted to bear against wear plates 19 embedded in the sides of the operating lever. Secured to the inner ends of each of the said packing blocks 16 and connecting the same to keep them at all times an equal distance apart is the chain 20 which passes over the operating lever and beneath the guide bracket 21 which is secured on the upper face of said lever.

In the use of my invention, I secure to the loop 22 fastened on the outer end of the operating lever the whiffle tree 23 to which I may hitch one or two horses as desired to operate my baler. I then drive the horse in one direction to oscillate the lever and cause the wear plate thereof to bear against the antifriction roller of one of the packing blocks. This will cause the said block to move inward into the inclosed portion of the baler and to tightly pack the hay contained therein. At the same time the chain will draw the other block and cause it to move with the lever, thus moving the block away from the other baling chamber to allow hay to be thrown into the open portion of the chamber between the reduced walls 15, this hay then being in position to be packed upon the reverse oscillation of the lever caused by the driving of the horse in the opposite direction. The hay is thus alternately packed in the two sides of the baler, the hay being loaded into one side as it is being compressed in the other side, the lever riding over the top of the reduced portions 15 which are preferably provided with the reinforcing plates 24 on their upper faces to prevent undue wearing of the same by the lever.

From the foregoing description taken in connection with the accompanying drawings, the construction and use of my improved hay baler will be readily apparent, and it will be seen that the sides of the lever bear alternately against the antifriction rollers of the packing blocks and bearing against the rollers on the upper portions of the said blocks serve to tightly force the blocks into the inclosed portion of the baling chamber to tightly pack the hay, the inner face of the inclosing walls 12 having grooves 25 formed therein to receive the baling wires to surround the bales. It will further be seen that on account of the chain connection between the blocks on opposite sides of the lever the blocks have free relative movement and there is less danger of the same wedging against the sides of the baler than would be the case were they securely fastened together or pivotally connected by common links which would allow of but slight play. It will further be observed that on account of the great simplicity of my baler, it may be readily operated and while it can be installed at but slight expense it will prove thoroughly efficient and will require but few men to operate the same, the only operation being the loading of the hay, the driving of the team operating the lever and the tying of the bale wires around the bale.

I claim:

1. A hay baler, comprising a platform, baling chambers having open inner ends meeting in a V, a lever pivoted to oscillate above the open portion of the said chambers, a packing block mounted in the open portions of each of the said chambers and bearing an antifriction roller on its end so disposed as to be engaged by the lever as the lever is oscillated, and a chain slidably secured on the lever and having its ends secured to the blocks for holding the blocks with their rollers at all times adjacent the sides of the levers.

2. The combination with a platform, of a pair of baling chambers mounted thereon and disposed at an angle to each other, said chambers having a reduced inner portion, packing blocks slidably mounted in said reduced inner portion and bearing antifriction rollers on the inner ends of their upper portions, a chain secured to and connecting the two blocks to hold them in desired spaced relation, and an operating lever rotatably mounted and having a portion adapted to move along the reduced portions of the two chambers, said lever projecting between the rollers on the inner ends of the two blocks, a portion of the said rollers projecting above the top of the reduced portions of the sides of the bale packing chambers, whereby as the lever is oscillated in either direction the sides of the lever will bear against one of the said rollers and will force the blocks into the inclosed portion of the chamber to pack the bale therein, the rollers riding on the lever to allow of relative movement of the block and lever while the chain serves to draw the other block out of its packing chamber to open the said chamber to permit of introduction of additional material thereinto.

In testimony whereof I affix my signature, in the presence of two witnesses.

GEORGE HEIDGERKEN.

Witnesses:
JAMES BOYD,
MAE E. LYNCH.